(12) United States Patent
Sun

(10) Patent No.: US 8,333,062 B2
(45) Date of Patent: Dec. 18, 2012

(54) METHOD FOR MONITORING AMMONIA STORAGE IN AN EXHAUST AFTERTREATMENT SYSTEM

(75) Inventor: Min Sun, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 375 days.

(21) Appl. No.: 12/818,283

(22) Filed: Jun. 18, 2010

(65) Prior Publication Data

US 2010/0326052 A1 Dec. 30, 2010

Related U.S. Application Data

(60) Provisional application No. 61/221,137, filed on Jun. 29, 2009.

(51) Int. Cl.
*F01N 3/28* (2006.01)
(52) U.S. Cl. ............... 60/286; 60/274; 60/276; 60/295; 60/301; 60/303
(58) Field of Classification Search ............ 60/274, 60/276, 282, 286, 295, 301, 303
See application file for complete search history.

(56) References Cited

U.S. PATENT DOCUMENTS

2004/0057889 A1* 3/2004 Buzanowski ............... 423/235
2007/0157608 A1* 7/2007 Gandhi et al. ............. 60/286
2009/0049827 A1* 2/2009 Wei et al. .................. 60/286

FOREIGN PATENT DOCUMENTS
WO 2009017598 A1 2/2009

OTHER PUBLICATIONS

Chi, John N., et al., Modelling and Control of a Urea-SCR Aftertreatment System; SAE 2005-01-0966; 2005 SAE World Congress; SAE, Warrendale, PA, USA.
Wurzenberger, Johann C., et al.; Multi-Scale SCR Modeling, 1D Kinetic Analysis and 3D System Simulation; SAE 2005-01-0948; 2005 SAE World Congress; SAE, Warrendale, PA, USA.
Schar, C.M., et al.; Control-Oriented Model of an SCR Catalytic Converter System; SAE 2004-01-0153; 2004 SAE World Congress; SAE, Warrendale, PA, USA.
Kim, Jeong Y., et al.; Laboratory Studies and Mathematical Modeling of Urea SCR Catalyst Performance; SAE 2007-01-1573; 2007 SAE World Congress; SAE, Warrendale, PA, USA.
Lietti, Luca, et al.; Dynamics of the SCR-DeNOx Reaction by the Transient-Response Method; AIChE Journal; vol. 43, No. 10; Oct. 1997.
Shost, et al.; Monitoring, Feedback and Control of Urea SCR Dosing Systems for NOx Reduction: Utilizing an Embedded Model and Ammonia Sensing; SAE 2008-01-1325; 2008 SAE World.
Winkler, et al.; Modeling of SCR DeNOx Catalyst-Looking at the Impact of Substrate Attributes; SAE 2003-01-0845; 2003 SAE World Congress; SAE, Warrendale, PA, USA.

\* cited by examiner

*Primary Examiner* — Thomas E. Denion
*Assistant Examiner* — Jorge Leon, Jr.

(57) ABSTRACT

A method for monitoring the ammonia-selective catalyst reduction device includes monitoring states of parameters of the exhaust gas feedstream upstream of the ammonia-selective catalyst reduction device, analytically segmenting the ammonia-selective catalyst reduction device into a plurality of discrete substrate elements, sequentially calculating a change in ammonia storage for each of the discrete substrate elements, and determining a total ammonia storage concentration on the ammonia-selective catalyst reduction device based upon the sequentially calculated change in ammonia storage for each of the discrete substrate elements.

19 Claims, 3 Drawing Sheets

METHOD FOR MONITORING AMMONIA STORAGE IN AN EXHAUST AFTERTREATMENT SYSTEM

CROSS REFERENCE TO RELATED APPLICATIONS

This application claims the benefit of U.S. Provisional Application No. 61/221,137, filed on Jun. 29, 2009, which is incorporated herein by reference.

TECHNICAL FIELD

This disclosure is related to exhaust aftertreatment systems for internal combustion engines.

BACKGROUND

The statements in this section merely provide background information related to the present disclosure and may not constitute prior art.

Known engine control strategies to improve fuel economy and reduce fuel consumption in internal combustion engines include operating at a lean air/fuel ratio. This includes control strategies for engines configured to operate in compression-ignition and lean-burn spark-ignition combustion modes. Engines operating at lean air/fuel ratios can have increased local combustion temperatures leading to increased NOx emissions.

A known exhaust aftertreatment system and control strategy for managing and reducing NOx emissions includes a urea injection control system and an associated ammonia-selective catalytic reduction device. The urea injection control system injects a reductant, e.g., urea into an exhaust gas feedstream upstream of the ammonia-selective catalytic reduction device. The injected urea decomposes to ammonia, which reacts with NOx in the presence of a catalyst to produce nitrogen. Some amount of ammonia can be stored on the ammonia-selective catalytic reduction device, enabling continued NOx reduction when the urea injection control system is not capable of dispensing a controlled amount of urea. Known control systems include dispensing urea at a rate that corresponds to concentrations of engine-out NOx emissions to achieve NOx reduction without using excess amounts of urea, i.e., at a urea/NOx stoichiometric ratio.

SUMMARY

An ammonia-selective catalyst reduction device is configured to treat an exhaust gas feedstream of an internal combustion engine. A method for monitoring the ammonia-selective catalyst reduction device includes monitoring states of parameters of the exhaust gas feedstream upstream of the ammonia-selective catalyst reduction device, analytically segmenting the ammonia-selective catalyst reduction device into a plurality of discrete substrate elements, sequentially calculating a change in ammonia storage for each of the discrete substrate elements, and determining a total ammonia storage concentration on the ammonia-selective catalyst reduction device based upon the sequentially calculated change in ammonia storage for each of the discrete substrate elements.

BRIEF DESCRIPTION OF THE DRAWINGS

One or more embodiments will now be described, by way of example, with reference to the accompanying drawings, in which.

DETAILED DESCRIPTION

Figure 1:
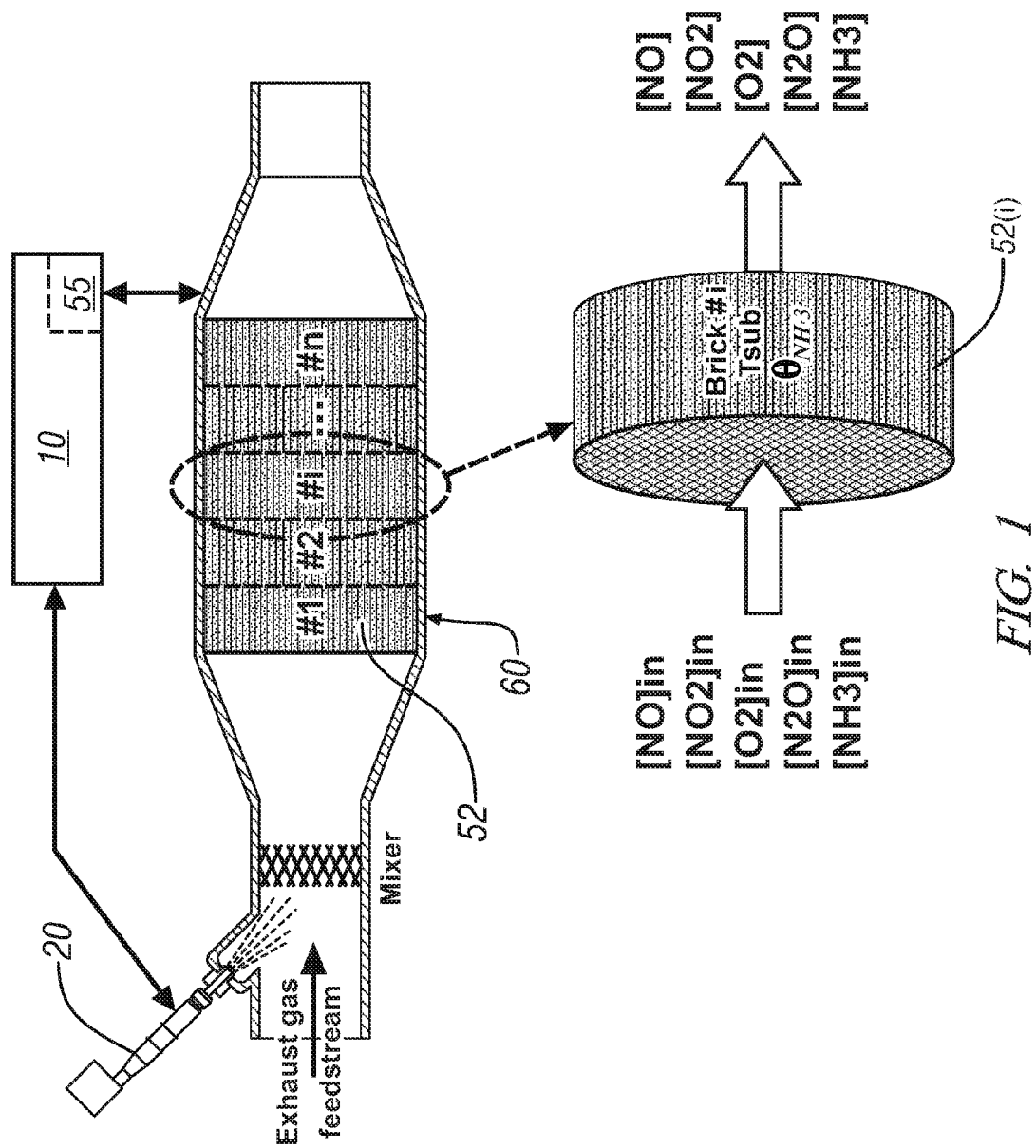
FIG. 1 is a two-dimensional schematic diagram of an ammonia-selective catalytic reactor device of an exhaust aftertreatment system in accordance with the present disclosure.

Referring now to the drawings, wherein the showings are for the purpose of illustrating certain exemplary embodiments only and not for the purpose of limiting the same, FIG. 1 schematically illustrates an exhaust aftertreatment device 60 for treating elements of an exhaust gas feedstream output from an internal combustion engine, including an internal combustion engine that operates lean of stoichiometry. It is appreciated that the internal combustion engine can include an engine configured to operate in a compression-ignition combustion mode, an engine configured to operate in a lean-burn spark-ignition combustion mode, and an engine configured to operate in a homogeneous-charge compression ignition combustion mode. The exhaust aftertreatment device 60 described herein is an ammonia-selective catalytic reactor device (NH3-SCR device) including a coated substrate 52.

It is appreciated that the NH3-SCR device 60 is an element of an exhaust aftertreatment system that may include other aftertreatment devices. In one embodiment the exhaust aftertreatment system can include a plurality of aftertreatment devices each of which includes a device that employs technologies having various capabilities for treating the constituent elements of the exhaust gas feedstream. Treating the constituent elements of the exhaust gas feedstream may include oxidation, selective catalytic reduction using a reductant, particulate filtering, and other treatments. Design features for each aftertreatment device include total volume, space velocity, cell density, washcoat materials, loading(s) of catalytic material(s), and vehicle/engine compartment locations, which are determined for specific applications. In one embodiment, a first aftertreatment device is a three-way catalyst that is located upstream of the NH3-SCR device 60, which is located upstream of a third aftertreatment device that includes a catalyzed particulate filter, although the concepts described herein are not so limited. The first, second, and third aftertreatment devices are fluidly connected in series using known pipes and connectors. The first, second, and third aftertreatment devices can be assembled into individual structures that are fluidly connected and assembled in an engine compartment and a vehicle underbody with one or more sensing devices placed therebetween. One skilled in the art can conceive of other assembly configurations.

The exemplary NH3-SCR device 60 is depicted using a two-dimensional schematic model with an exhaust gas feedstream flowing therethrough. In one embodiment there is a urea injection device 20 and associated urea delivery system upstream of a mixer device that is upstream of the NH3-SCR device 60. The NH3-SCR device 60 includes one or more ceramic coated substrates 52 preferably fabricated from cordierite material and having a multiplicity of flowthrough passageways that are coated with washcoat and catalytic materials to store ammonia for reacting with NOx molecules present in the exhaust gas feedstream. It is appreciated that ammonia storage concentration ($\theta_{NH3}$) may be unevenly distributed along a flow axis of the coated substrate(s) 52.

A control module 10 is configured to monitor and control engine operation and monitor the exhaust gas feedstream. The control module 10 monitors or otherwise determines states of parameters of the exhaust gas feedstream. The control module 10 controls operation of the urea injection device 20. The control module 10 includes a virtual sensor 55 configured to estimate ammonia storage concentration ($\theta_{NH3}$) on the coated substrate 52 during ongoing operation of the engine. The virtual sensor 55 is achieved by executing algorithmic code and a plurality of predetermined calibration arrays that temporally determine the ammonia storage concentration ($\theta_{NH3}$) stored on the coated substrate 52. The virtual sensor 55 is described in detail with reference to FIG. 2. The ammonia storage concentration ($\theta_{NH3}$) is preferably expressed as a ratio of stored ammonia to a maximum ammonia storage capacity for the coated substrate 52 or portion thereof, and can be in terms of mass/mass, moles/moles, or other suitable measurement.

The control module 10 is configured to monitor or otherwise determine states of parameters of the exhaust gas feedstream flowing into the NH3-SCR device 60. Preferred parameters of the exhaust gas feedstream include an inlet temperature of the exhaust gas feedstream, pressure, mass flowrate, oxygen concentration, NOx concentrations, and other parameters from which concentrations of input gases including nitrogen oxide, nitrogen dioxide, nitrous oxide, oxygen, and ammonia can be determined, as is appreciated by one skilled in the art. The substrate temperature $T_{sub}$ can be monitored with a temperature sensor or determined by executing a mathematical model based upon the parameters of the exhaust gas feedstream and catalytic reaction rates of the coated substrate 52.

As used herein, the control module 10, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 10 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The coated substrate(s) 52 is analytically segmented into a plurality of discrete elements 52(i), i=1 through n, or bricks, positioned in series along a flow axis of the exhaust gas feedstream. Segmenting the coated substrate(s) 52 into the plurality of discrete elements provides an analytical framework for implementing the virtual sensor 55 to determine the ammonia storage concentration ($\theta_{NH3}$) in real-time on the NH3-SCR device 60 during ongoing operation of the engine.

FIG. 1A shows a single discrete substrate element 52(i). Each discrete substrate element 52(i) is characterized in terms of substrate operating temperature ($T_{sub}$) and the ammonia storage concentration ($\theta_{NH3}$). The exhaust gas feedstream passing through each discrete substrate element 52(i) is characterized in terms of concentrations of input gases including nitrogen oxide [NO]in, nitrogen dioxide [NO2]in, nitrous oxide [N2O]in, oxygen [O2]in, and ammonia [NH3]in, and corresponding output gases including nitrogen oxide [NO], nitrogen dioxide [NO2], nitrous oxide [N2O], oxygen [O2], and ammonia [NH3].

Figure 2:
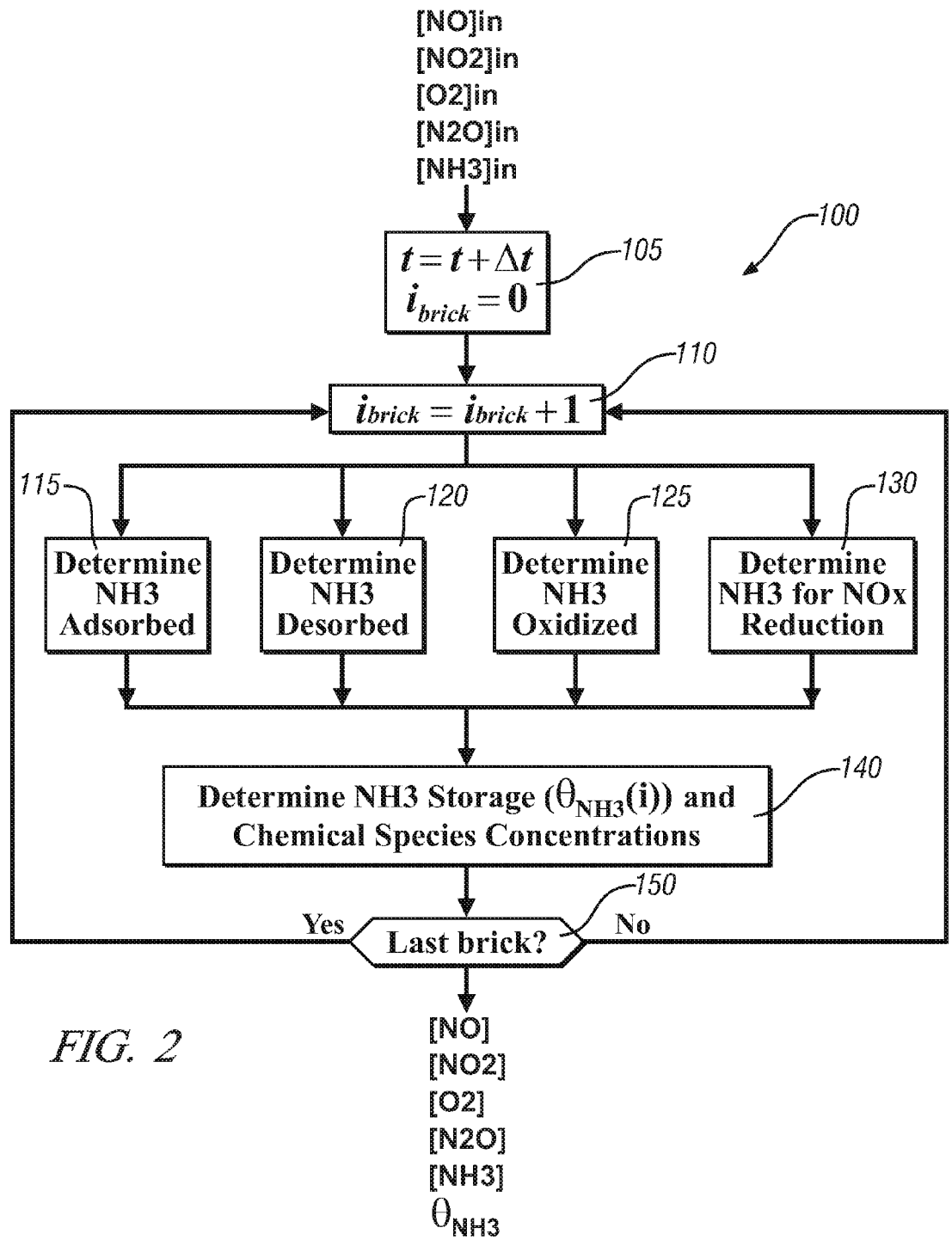
FIG. 2 is a schematic diagram of an algorithmic flowchart for sequentially determining ammonia storage in a stepwise fashion for each of a plurality of discrete substrate elements over an elapsed time period for an ammonia-selective catalytic reactor device in accordance with the present disclosure.

FIG. 2 schematically shows a process 100 in flowchart form that is an element of the virtual sensor 55 that is executed to determine ammonia storage concentration ($\theta_{NH3}$) for the total coated substrate 52. Other elements of the virtual sensor 55 are described herein. It is appreciated that the virtual sensor 55 can be reduced to algorithmic code and executed in the control module 10 during ongoing engine operation to determine the ammonia storage concentration ($\theta_{NH3}$) for the entire coated substrate 52 in real-time. The process 100 includes determining a change in ammonia storage for each of the discrete substrate elements 52(i) over an elapsed time period and then determining the total ammonia storage concentration ($\theta_{NH3}$) on the coated substrate 52 based thereon. Determining a change in the ammonia storage concentration ($\theta_{NH3}$) includes sequentially determining a change in ammonia storage in a stepwise fashion for each of the discrete substrate elements 52(i), i=1 through n, over an elapsed time period $\Delta t$ based upon the concentrations of the input gases of nitrogen oxide [NO]in, nitrogen dioxide [NO2]in, nitrous oxide [N2O]in, oxygen [O2]in, and ammonia [NH3]in and substrate temperature. This includes determining, for each discrete substrate element 52(i) (110) for each elapsed time period $\Delta t$ (105), an amount of ammonia that is adsorbed (115), an amount of ammonia that is desorbed (120), an amount of ammonia that is oxidized (125), and an amount of ammonia that is consumed during reduction of NOx in the exhaust gas feedstream (130). The amounts of ammonia that is adsorbed (115), desorbed (120), oxidized (125), and consumed during reduction of NOx (130) can be in any suitable units of measure, including, e.g., mass, volume, or moles.

The change in the ammonia storage concentration ($\theta_{NH3}$) and concentrations of other chemical species are determined in a stepwise fashion for each of the discrete substrate elements 52(i) using the foregoing steps 115, 120, 125 and 130 (140), which are repeated for each of the discrete substrate elements 52(i) for each elapsed time period $\Delta t$. An output for the discrete substrate element 52(i) is determined that includes corresponding concentrations of output gases of nitrogen oxide [NO], nitrogen dioxide [NO2], nitrous oxide [N2O], ammonia [NH3], oxygen [O2], and a cumulative ammonia storage concentration [$\theta_{NH3}$]. The control module 10 can use the information to control engine fueling and air/fuel ratio for the exemplary powertrain system of FIG. 1 based upon inputs including the ammonia storage concentration ($\theta_{NH3}$) on the coated substrate 52 (NH3_storage), as described with reference to FIG. 3.

The following set of equations describes reaction chemistry occurring in each of the discrete substrate elements 52(i) of the coated substrate 52.

$$4NH_3+4NO+O_2=4N_2+6H_2O \quad (A)$$

$$2NH_3+NO+NO_2=2N_2+3H_2O \quad (B)$$

$$8NH_3+6NO_2=7N_2+12H_2O \quad (C)$$

$$4NH_3+3O_2=2N_2+6H_2O \quad (D)$$

$$4NH_3 + 5O_2 = 4NO + 6H_2O \quad (E)$$

$$4NH_3 + 4NO + 3O_2 = 4N_2O + 6H_2O \quad (F)$$

$$2NH_3 + 2NO_2 = N_2O + N_2 + 3H_2O \quad (G)$$

$$2NH_3 + 2O_2 = N_2O + 3H_2O \quad (H)[1]$$

The kinetic reactions and ammonia adsorption and desorption occur on the catalyst surface of one of the discrete substrate elements $52(i)$. The ammonia storage results from dynamic balance among the adsorption, desorption and kinetic reaction rates. For each of the discrete substrate elements $52(i)$, i=1 to n, the inlet parameter values are the outlet parameter values of the contiguous upstream discrete substrate element $52(i-1)$. The kinetic reaction rates rely on the ammonia storage concentration ($\theta_{NH3}$) and the other related chemical concentrations.

The amount of ammonia that is adsorbed (115) can be determined as follows:

$$\Delta[NH3]_{adsorption} = \eta_{adsorption}\left([NH3]_{in} + \frac{t_{resident}}{\Delta t}[NH3]_{-\Delta t} + \Delta[NH3]_{desorption}\right) \quad [2]$$

wherein an adsorption efficiency term $\eta_{adsorption}$ is preferably selected from a predetermined array $F_{table\_adsorp}(T_{sub}, \zeta_{adsorp})$ that is stored in tabular form in the control module 10. A specific value for the adsorption efficiency term $\eta_{adsorption}$ correlates to substrate temperature $T_{sub}$ and an adsorption capacity term $\zeta_{adsorp}$, which are described as follows:

$$\eta_{adsorption} = F_{table\_adsorp}(T_{sub}, \xi_{adsorp}) \quad [3]$$

$$\xi_{adsorp} = (1 - \theta_{NH3})^* \Omega^* \frac{t_{resident}}{\frac{t_{resident}}{\Delta t} + 1}$$

wherein $[NH3]_{-\Delta t}$ is the NH3 concentration in the discrete substrate element $52(i)$ at a previous timestep;

$[NH3]_{in}$ is the NH3 concentration at the inlet to the discrete substrate element $52(i)$;

$T_{sub}$ is the substrate temperature of the discrete substrate element $52(i)$;

$\Delta t$ is the elapsed time period;

$\theta_{NH3}$ is the ammonia storage concentration for the discrete substrate element $52(i)$;

$t_{resident}$ is the gas resident time, which can be determined based upon the volume of the discrete substrate element $52(i)$ and the volumetric flowrate of the exhaust gas feedstream; and $\Omega$ is a specific ammonia storage capacity for the discrete substrate element $52(i)$, which is preferably stored in the control module 10, and is considered a constant. The specific ammonia storage capacity can be in any suitable units of measure, including, e.g., mass, volume, or moles, and is preferably consistent with other measurements and estimates of ammonia storage capacity.

With known states for each of the aforementioned parameters, i.e., $[NH3]_{in}, [NH3]_{-\Delta t}, \Delta[NH3]_{desorption}, T_{sub}, \theta_{NH3}$, and $t_{resident}$, the amount of ammonia that is adsorbed in the discrete substrate element $52(i)$, i.e., can be determined. $\Delta[NH3]_{adsorption}$ can be determined.

The amount of ammonia that is desorbed, i.e., $\Delta[NH3]_{desorption}$ (120) can be determined using the specific ammonia storage capacity for the discrete substrate element $52(i)$ $\Omega$, the residence time $t_{resident}$, and the ammonia storage concentration ($\theta_{NH3}$) for the discrete substrate element $52(i)$ in combination with a predetermined desorption term $F_{table\_desorp}(T_{sub}, \theta_{NH3})$ as described below in Eq. 4. The predetermined desorption term $F_{table\_desorp}(T_{sub}, \theta_{NH3})$ is selected from a predetermined array of values stored in a memory lookup table, and is associated with the substrate temperature $T_{sub}$ and ammonia storage concentration ($\theta_{NH3}$) for the discrete substrate element $52(i)$.

$$\Delta[NH3]_{desorption} = F_{table\_desorp}(T_{sub}, \theta_{NH3}) * \theta_{NH3} * \Omega * t_{resident} \quad [4]$$

The amount of ammonia that is oxidized, i.e., $\Delta[NH3]_{oxidation}$ (125) can be determined as follows:

$$\Delta[NH3]_{oxidation} = \Delta[NH3]_{oxid\_N_2} + \Delta[NH3]_{oxid_{NO}} + \Delta[NH3]_{oxid\_N_2O} \quad [5]$$

The terms of Eq. 5 include an amount of ammonia oxidized in forming nitrogen, i.e., $\Delta[NH3]_{oxid\_N_2}$, an amount of ammonia oxidized in forming NO, i.e., $\Delta[NH3]_{oxid\_NO}$, and an amount of ammonia oxidized in forming $N_2O$, i.e., $\Delta[NH3]_{oxid\_N_2O}$, which can be determined as described below. The aforementioned terms include predetermined oxidation terms $F_{table\_oxid\_N_2}$, $F_{table\_oxid\_NO}$ and $F_{table\_oxid\_N_2O}$ that are selected from corresponding predetermined arrays that are preferably stored in tabular form in the control module 10. Specific values for each of the predetermined oxidation terms correspond to the substrate temperature $T_{sub}$ and ammonia storage concentration ($\theta_{NH3}$) for the discrete substrate element $52(i)$ as follows:

$$\Delta[NH3]_{oxid\_N_2} = F_{table\_oxid\_N_2}(T_{sub}, \theta_{NH3}) * [O_2] * \Omega * t_{resident} \quad (A)$$

$$\Delta[NH3]_{oxid\_NO} = F_{table\_oxid\_NO}(T_{sub}, \theta_{NH3}) * [O_2] * \Omega * t_{resident} \quad (B)$$

$$\Delta[NH3]_{oxid\_N_2O} = F_{table\_oxid\_N_2O}(T_{sub}, \theta_{NH3}) * [O_2] * \Omega * t_{resident} \quad (C)$$

wherein $[O_2]$ is oxygen concentration, $t_{resident}$ is a gas resident time in the discrete substrate element $52(i)$, $\theta_{NH3}$ is the ammonia storage concentration, and $\Omega$ is the specific ammonia storage capacity for the discrete substrate element $52(i)$.

The three oxidation reactions described in Eq. 6 correspond to oxidation rates related to (A) $\Delta[NH3]_{oxid\_N_2}$ and (B) $\Delta[NH3]_{oxid\_NO}$ of Eq. 1, respectively, to describe an amount of ammonia that is consumed thereby.

The amount of ammonia that is consumed for NOx reduction (130) can be determined as follows.

$$\Delta[NH3]_{NOx\_conversion} = \quad [7]$$

$$\left\{[NO_x]_{in} + \frac{t_{resident}}{\Delta t}[NO_x]_{-\Delta t} + \Delta[NH3]_{oxid\_NO}\right\} \times$$

$$\{(1 - R_{NO_2})[1 - (1 - \eta_{NO_x})(1 - \eta_{NO})] + \quad (A)$$

$$\frac{4}{3}[R_{NO_2} - \eta_{NO_x}(1 - R_{NO_2})]\eta_{NO_2} + \quad (B)$$

$$\eta_{NO_x}(1 - R_{NO_2})\} \quad (C)$$

The terms set forth in Eq. 7 include reduction efficiency terms $\eta_{NO}$, $\eta_{NO_2}$, and $\eta_{NO_x}$ that indicate efficiencies associated with consumption of ammonia in reducing NO, NO$_2$, and NO$_x$, respectively. The aforementioned efficiency terms are determined as follows:

$$\eta_{NO} = F_{table\_NO}(T_{sub}, \zeta_{NO})$$

$$\zeta_{NO} = f_{table\_O2\_NO}([O_2])f_{table\_\theta ab1}(\theta_{NH3})^*\Omega^* t_{resident} \Big/ \Big(1 + \frac{t_{resident}}{\Delta t}\Big)$$

$$\eta_{NO_2} = F_{table\_NO_2}(T_{sub}, \zeta_{NO_2})$$

$$\zeta_{NO2} = f_{table\_\theta ab12}(\theta_{NH3})^*\Omega^* t_{resident} \Big/ \Big(1 + \frac{t_{resident}}{\Delta t}\Big)$$

$$\eta_{NOx} = F_{table\_NOx}(\eta_{NO_{x\_2}}, R_{NO_2})$$

$$\eta_{NO_{x\_2}} = f_{table\_NO_{x\_2}}(\eta_{NO_{x\_1}}, [NO_x]_{aver}^*(1-\eta_{NO})^*(1-\eta_{NO_2}))$$

$$\eta_{NO_{x\_1}} f_{table\_NO_{x\_1}}(T_{sub}, \zeta_{NOx})$$

$$\zeta_{NOx} = f_{table\_\theta ab1x}(\theta_{NH3})\Omega_{resident} \Big/ \Big(1 + \frac{t_{resident}}{\Delta t}\Big)$$

wherein:

$$[NO_x]_{aver} = \frac{[NO_x]_{aver}([NO_x]_{in} + t_{resident}/\Delta t[NO_x]_{-\Delta t} + \Delta[NH3]_{oxide\_NO})}{(1 + t_{resident}/\Delta t)}$$

$$R_{NO_2} = \frac{([NO_2]_{in} + t_{resident}/\Delta t[NO_2]_{-\Delta t})}{([NO_x]_{in} + t_{resident}/\Delta t[NO_x]_{-\Delta t} + \Delta[NH3]_{oxide\_NO})}$$

$$[NO_x]_{in} = [NO]_{in} + [NO_2]_{in}$$

$$[NO_x]_{-\Delta t} = [NO]_{-\Delta t} + [NO_2]_{-\Delta t}$$

The term $R_{NO2}$ denotes a ratio of NO$_2$/NOx in the incoming gas feedstream. The reduction efficiency terms $\eta_{NO}$, $\eta_{NO_2}$, and $\eta_{NOx}$ change with substrate temperature $T_{sub}$ and consumption capacities of the substrate element 52 associated with NO, NO$_2$, and NO$_x$, respectively, which are expressed as terms $\zeta_{NO}$, $\zeta_{NO2}$, and $\zeta_{NOx}$, respectively. Each of the consumption capacity terms associated with the discrete substrate element 52($i$), i.e., $\zeta_{NO}$, $\zeta_{NO2}$, and $\zeta_{NOx}$ is calculated as a function of residence time $t_{resident}$, specific ammonia storage capacity $\Omega$, and a related scaling term, i.e., $f_{table\_\theta\_NO2}(\theta_{NH3})$, $f_{table\_\theta\_NOx}(\theta_{NH3})$, $f_{table\_\theta\_NO}(\theta_{NH3})$ and $f_{table\_O2\_NO}([O_2])$, each of which is a function of either the ammonia storage concentration ($\theta_{NH3}$) or the oxygen concentration (O$_2$). As is appreciated, the consumption capacities of the substrate element 52 are based upon a relationship between the ammonia storage concentration ($\theta_{NH3}$), ammonia storage capacity $\Omega$, and residence time $t_{resident}$ of the exhaust gas in the discrete substrate element 52($i$). The consumption capacities of the substrate element 52 associated with NO, NO$_2$, and NO$_x$, i.e. $\zeta_{NO}$, $\zeta_{NO2}$, and $\zeta_{NOx}$, respectively, are preferably predetermined and stored as arrays in tabular form in the control module 10.

The reduction efficiency terms associated with NO, NO$_2$, and NO$_x$, i.e., $\eta_{NO}$, $\eta_{NO_2}$, and $\eta_{NOx}$, respectively, are selected from predetermined arrays that are preferably stored in tabular form in the control module 10. The predetermined arrays are searchable in terms of the substrate temperature $T_{sub}$ and the corresponding consumption capacity of the substrate, i.e., one of $\zeta_{NO}$, $\zeta_{NO2}$, and $\zeta_{NOx}$.

Thus, the ammonia storage concentration ($\theta_{NH3}$) can be determined (140) as follows.

$$\theta_{NH3,t} = \quad [8]$$
$$\theta_{NH3,t-\Delta t} + (\Delta[NH3]_{adsorption} - \Delta[NH3]_{desorption} - \Delta[NH3]_{oxidation} - \Delta[NH3]_{NOx\_conversion})\Big(\frac{\Delta t}{\Omega t_{resident}}\Big)$$

$\Delta[NH3]_{adsorption}$ includes an amount of ammonia adsorbed into a catalyst surface per volume of gases passing through the discrete substrate element 52($i$), $\Delta[NH3]_{desorption}$ includes an amount of ammonia desorbed from catalyst surface per volume of gases passing through the discrete substrate element 52($i$), $\Delta[NH3]_{oxidation}$ includes an amount of ammonia oxidized per volume of gases passing through the discrete substrate element 52($i$), and $\Delta[NH3]_{NOx\_conversion}$ includes an amount of ammonia consumed for NOx reduction per volume of gases passing through the discrete substrate element 52($i$).

The chemical species concentrations for the discrete substrate element 52($i$) can be determined for NO, NO$_2$, ammonia, and N$_2$O concentrations as follows.

$$[NO] = \frac{(1-R_{NO_2})(1-\eta_{NO_x})(1-\eta_{NO})\Big([NO_x]_{in} + \frac{t_{resident}}{\Delta t}[NO_x]_{-\Delta t} + \Delta[NH3]_{oxid\_NO}\Big)}{\Big(1 + \frac{t_{resident}}{\Delta t}\Big)} \quad [9]$$

$$[R_{NO_2} - \eta_{NO_x}(1-R_{NO_2})] \quad [10]$$

$$[NO_2] = \frac{(1-\eta_{NO_2})\Big([NO_x]_{in} + \frac{t_{resident}}{\Delta t}[NO_x]_{-\Delta t}\Big)}{\Big(1 + \frac{t_{resident}}{\Delta t}\Big)}$$

$$[NH3] = \frac{(1-\eta_{adsorption})\Big([NH3]_{in} + \frac{t_{resident}}{\Delta t}[NH3]_{-\Delta t} + \Delta[NH3]_{desorption}\Big)}{\Big(1 + \frac{t_{resident}}{\Delta t}\Big)} \quad [11]$$

$$[N_2O] \frac{\Big([N_2O]_{in} + \frac{t_{resident}}{\Delta t}[N_2O]_{-\Delta t} + \Delta[N_2O]\Big)}{\Big(1 + \frac{t_{resident}}{\Delta t}\Big)} \quad [12]$$

wherein $[NO]_{-\Delta t}$, $[NO_2]_{-\Delta t}$, $[N_2O]_{-\Delta t}$ and $[NH3]_{-\Delta t}$ are the concentration values in the discrete substrate element 52($i$) defined at the previous timestep for NO, NO$_2$, N$_2$O, and ammonia.

$$\Delta[N_2O] = \Delta[NH3]_{oxid\_N_2O} + \Delta[N_2O]_{NO_2}\Delta[N_2O]_{NO} \quad [13]$$

$$\Delta[N_2O]_{NO} = \Delta[NO]_{in}(1-\eta_{NO_x})\eta_{NO}\gamma_{table\_NO\_N_2O}(T_{sub}) \quad [14]$$

$$\Delta[N_2O]_{NO_2} = ([NO_2]_{in} - \eta_{NO_x}[NO]_{in})\eta_{NO_2}\gamma_{table\_NO_2\_N_2O}(T_{sub}) \quad [15]$$

wherein $\gamma_{table\_NO\_N_2O}$ and $\gamma_{table\_NO_2\_N_2O}$ are reaction rate terms that are selected from a predetermined array that is stored in tabular form in the control module 10. A specific value for each of the reaction rate terms is retrievable as a function of the substrate temperature $T_{sub}$.

Thus, the virtual sensor 55 can be used to determine ammonia storage concentration ($\theta_{NH3}$) for the entire coated substrate 52 by sequentially determining a change in ammonia storage for each of the discrete substrate elements in a stepwise fashion for each of the discrete substrate elements 52($i$), i=1 through n, over an elapsed time period, and determining the ammonia storage concentration ($\theta_{NH3}$) on the ammonia-selective catalyst reduction device corresponding to the change in ammonia storage for the discrete substrate elements 52(*i*).

Figure 3:
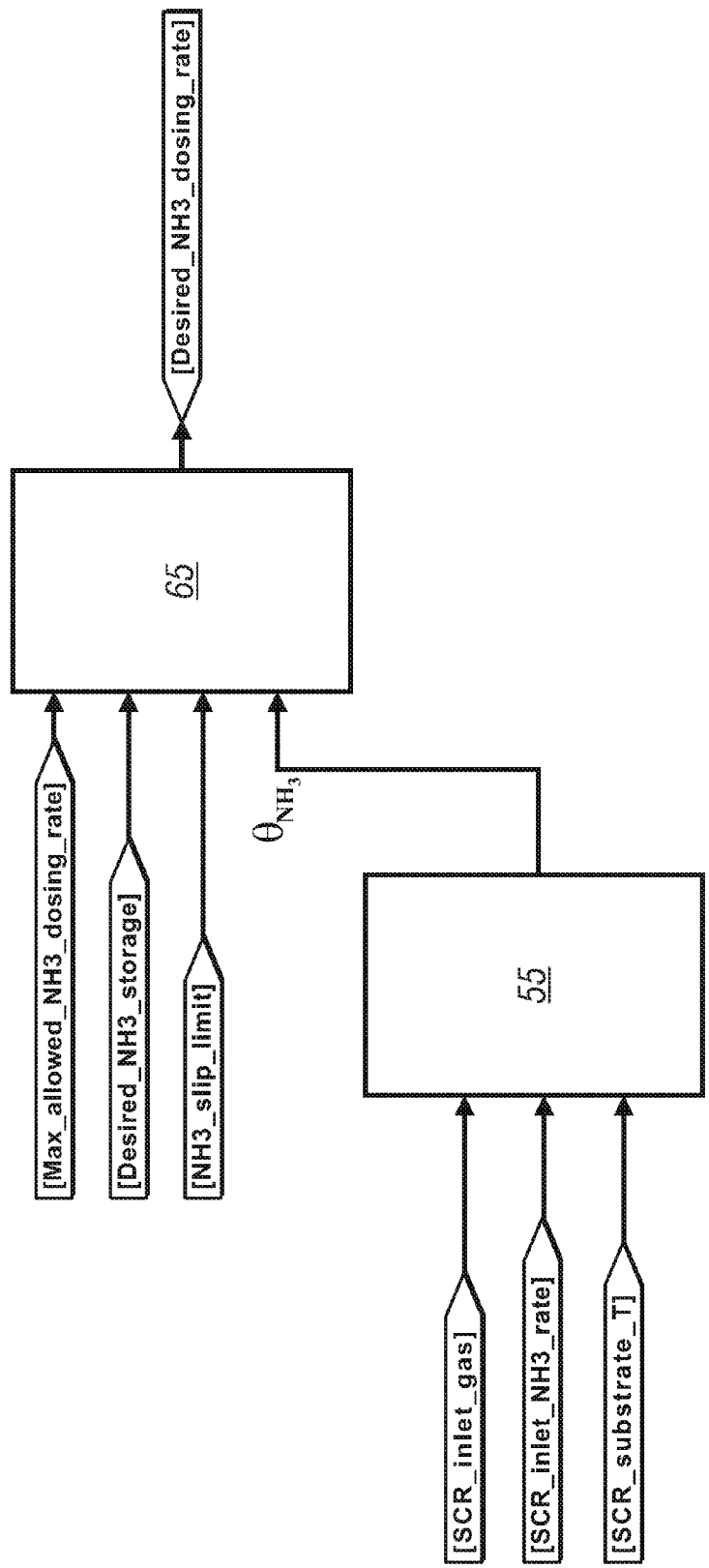
FIG. 3 is a schematic diagram of an algorithmic flowchart for determining a preferred urea dosing rate in accordance with the present disclosure.

FIG. 3 shows a control scheme for determining a preferred ammonia dosing rate (Desired_NH3_dosing_rate) for an exemplary internal combustion engine using the virtual sensor 55. Parameters of the exhaust gas feedstream including, e.g., oxygen concentration, NOx concentration, mass flowrate, pressure, and inlet gas temperatures (SCR_inlet_gas), the substrate temperature (SCR_substrate_T) and a present ammonia dosing rate (SCR_inlet_NH3_rate) are input to the virtual sensor 55. The virtual sensor 55 estimates the ammonia storage concentration ($\theta_{NH3}$) on the coated substrate 52 based thereon. The ammonia storage concentration ($\theta_{NH3}$) on the coated substrate 52 (NH3_storage), a maximum urea dosing rate (Max_allowed_NH3_dosing_rate), a desired ammonia storage amount (Desired_NH3_storage), and a maximum ammonia slip rate (NH3_slip_limit) are provided as inputs to an inverse model of the virtual sensor 65, from which a preferred urea dosing rate (desired_NH3_dosing_rate) can be determined.

The preferred urea dosing rate (Desired_NH3_storage) is a urea dosing rate that is sufficient to effectively reduce NOx in the exhaust gas feedstream over the coated substrate 52, circumscribed so as not to exceed either the maximum urea dosing rate or the maximum ammonia slip rate. The maximum urea dosing rate and the maximum ammonia slip rate can be constants, or can be threshold values associated with the temperature of the coated substrate 52. A control system controls the ammonia dosing rate based upon the ammonia storage concentration ($\theta_{NH3}$) on the coated substrate 52 and the desired ammonia storage concentration on the coated substrate 52, thus controlling the urea dosing rate by increasing or decreasing the dosing rate using known control techniques.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for monitoring an ammonia-selective catalyst reduction device configured to treat an exhaust gas feedstream of an internal combustion engine, comprising:
    monitoring states of parameters of the exhaust gas feedstream upstream of the ammonia-selective catalyst reduction device;
    analytically segmenting the ammonia-selective catalyst reduction device into a plurality of discrete substrate elements;
    sequentially calculating a change in ammonia storage for each of the discrete substrate elements; and
    determining a total ammonia storage concentration on the ammonia-selective catalyst reduction device based upon the sequentially calculated change in ammonia storage for each of the discrete substrate elements.

2. The method of claim 1, wherein sequentially calculating the change in ammonia storage for each of the discrete substrate elements comprises determining for each of the discrete substrate elements an amount of ammonia that is adsorbed, an amount of ammonia that is desorbed, an amount of ammonia that is oxidized, and an amount of ammonia that is consumed in reducing NOx in the exhaust gas feedstream.

3. The method of claim 2, wherein determining for each of the discrete substrate elements the amount of ammonia that is consumed in reducing NOx in the exhaust gas feedstream comprises:
    determining NO, $NO_2$, and NOx consumption capacities in the discrete substrate element;
    determining NO, $NO_2$, and NOx reduction efficiencies corresponding to the NO, NO2, and NOx consumption capacities and a temperature of the discrete substrate element; and
    calculating an amount of ammonia that is consumed in the discrete substrate element in reducing NOx in the exhaust gas feedstream during an elapsed time period corresponding to the NO, $NO_2$, and NOx reduction efficiencies, an amount of incoming NOx in exhaust gas incoming to the discrete substrate element, and a ratio of $NO_2$ and NOx in the exhaust gas feedstream.

4. The method of claim 3, wherein the NO, $NO_2$, and NOx consumption capacities in the discrete substrate element are determined as a function of ammonia storage concentration, ammonia storage capacity, and residence time of exhaust gas in the discrete substrate element.

5. The method of claim 2, wherein determining for each of the discrete substrate elements the amount of ammonia that is adsorbed comprises:
    determining an adsorption efficiency correlated to a temperature and an adsorption capacity of the discrete substrate element; and
    calculating an amount of ammonia that is adsorbed as a function of the adsorption efficiency, a concentration of ammonia at an inlet to the discrete substrate element and a gas resident time.

6. The method of claim 5, wherein determining the adsorption capacity of the discrete substrate element comprises determining the adsorption capacity as a function of a specific ammonia storage capacity for the discrete substrate element, a present ammonia storage concentration, and the gas resident time.

7. The method of claim 2, wherein determining for each of the discrete substrate elements the amount of ammonia that is desorbed comprises calculating an amount of ammonia that is desorbed based upon a present ammonia storage concentration, a specific ammonia storage capacity for the discrete substrate element, a gas resident time, and a desorption efficiency term.

8. The method of claim 1, wherein determining the total ammonia storage concentration on the ammonia-selective catalyst reduction device based upon the sequentially calculated change in ammonia storage for each of the discrete substrate elements comprises:
    sequentially calculating the changes in ammonia storage for each of the discrete substrate elements in a stepwise fashion; and
    determining the total ammonia storage concentration on the ammonia-selective catalyst reduction device based upon the sequentially calculated changes in ammonia storage for all the discrete substrate elements.

9. The method of claim 8, wherein sequentially calculating the change in ammonia storage for each of the discrete substrate elements in the stepwise fashion comprises dynamically balancing adsorption, desorption and kinetic reaction rates of ammonia and NOx in each of the discrete substrate elements.

10. The method of claim 1, further comprising controlling dosing of ammonia into the exhaust gas feedstream upstream of the ammonia-selective catalyst reduction device in response to the total ammonia storage concentration on the ammonia-selective catalyst reduction device and a NOx concentration in the exhaust gas feedstream.

11. Method for controlling dosing of ammonia into an exhaust gas feedstream upstream of an ammonia-selective catalyst reduction device, the exhaust gas feedstream originating from an internal combustion engine operating lean of stoichiometry, the method comprising:
- determining an amount of NOx gas in the exhaust gas feedstream upstream of the ammonia-selective catalyst reduction device;
- segmenting a substrate of the ammonia-selective catalyst reduction device into a plurality of discrete substrate elements oriented in series;
- calculating a change in ammonia storage for each of the discrete substrate elements;
- determining an ammonia storage concentration on the ammonia-selective catalyst reduction device based upon the calculated changes in ammonia storage for all the discrete substrate elements; and
- controlling dosing of ammonia into the exhaust gas feedstream upstream of the ammonia-selective catalyst reduction device in response to a total ammonia storage concentration on the ammonia-selective catalyst reduction device and the amount of NOx gas in the exhaust gas feedstream upstream of the ammonia-selective catalyst reduction device.

12. The method of claim 11, wherein calculating the change in ammonia storage for each of the discrete substrate elements comprises determining for each of the discrete substrate elements an amount of ammonia that is adsorbed, an amount of ammonia that is desorbed, an amount of ammonia that is oxidized, and an amount of ammonia that is consumed in reducing NOx in the exhaust gas feedstream.

13. The method of claim 12, wherein determining for each of the discrete substrate elements an amount of ammonia that is consumed in reducing NOx in the exhaust gas feedstream comprises:
- determining NO, $NO_2$, and NOx consumption capacities in the discrete substrate element;
- determining NO, $NO_2$, and NOx reduction efficiencies corresponding to the NO, NO2, and NOx consumption capacities and a temperature of the discrete substrate element; and
- calculating an amount of ammonia that is consumed in the discrete substrate element in reducing NOx in the exhaust gas feedstream during an elapsed time period corresponding to the NO, $NO_2$, and NOx reduction efficiencies, an amount of incoming NOx in exhaust gas incoming to the discrete substrate element, and a ratio of $NO_2$ and NOx in the exhaust gas feedstream.

14. The method of claim 13, wherein the NO, $NO_2$, and NOx consumption capacities in the discrete substrate element are determined as a function of ammonia storage concentration, ammonia storage capacity, and residence time of exhaust gas in the discrete substrate element.

15. The method of claim 12, wherein determining for each of the discrete substrate elements the amount of ammonia that is adsorbed comprises:
- determining an adsorption efficiency correlated to a temperature and an adsorption capacity of the discrete substrate element; and
- calculating an amount of ammonia that is adsorbed as a function of the adsorption efficiency, a concentration of ammonia at an inlet to the discrete substrate element and a gas resident time.

16. The method of claim 15, wherein determining the adsorption capacity of the discrete substrate element comprises determining the adsorption capacity as a function of a specific ammonia storage capacity for the discrete substrate element, a present ammonia storage concentration, and the gas resident time.

17. The method of claim 12, wherein determining for each of the discrete substrate elements the amount of ammonia that is desorbed comprises calculating an amount of ammonia that is desorbed based upon a present ammonia storage concentration, a specific ammonia storage capacity for the discrete substrate element, a gas resident time, and a desorption efficiency term.

18. The method of claim 11, wherein the total ammonia storage concentration on the ammonia-selective catalyst reduction device based upon the sequentially calculated change in ammonia storage for each of the discrete substrate elements is determined by:
- sequentially calculating the changes in ammonia storage for each of the discrete substrate elements in a stepwise fashion; and
- determining the total ammonia storage concentration on the ammonia-selective catalyst reduction device based upon the sequentially calculated changes in ammonia storage for all the discrete substrate elements.

19. The method of claim 18, wherein sequentially calculating the changes in ammonia storage for each of the discrete substrate elements in a stepwise fashion comprises dynamically balancing adsorption, desorption and kinetic reaction rates of ammonia and NOx in each of the discrete substrate elements.

* * * * *